United States Patent [19]

Pusch et al.

[11] Patent Number: 4,889,323

[45] Date of Patent: Dec. 26, 1989

[54] MILL ARRANGEMENT WITH PRIMARY GAS MIXING MEANS

[75] Inventors: Hermann Pusch, Leonding; Siegfried Zeller, Linz; Konstantin Millionis, Graz; Hans Kresl, Linz, all of Austria

[73] Assignee: Voest-Alpine Aktiengesellschaft, Austria

[21] Appl. No.: 79,673

[22] Filed: Jul. 30, 1987

[30] Foreign Application Priority Data

Aug. 7, 1986 [AT] Austria .................................. 2139/86

[51] Int. Cl.⁴ ............................................... F27B 19/04
[52] U.S. Cl. ......................................... 266/142; 75/35; 75/46; 266/144; 266/156; 266/160
[58] Field of Search ............... 266/156, 160, 142, 144; 75/34, 35, 41, 42, 46

[56] References Cited

U.S. PATENT DOCUMENTS

| | | | |
|---|---|---|---|
| 3,430,418 | 3/1969 | Wagner | 55/25 |
| 4,235,624 | 11/1980 | Wagener et al. | 75/35 |
| 4,363,654 | 12/1982 | Frederick et al. | 75/34 |
| 4,430,116 | 2/1984 | Yamazaki et al. | 75/34 |
| 4,589,888 | 5/1986 | Hiscock et al. | 55/26 |
| 4,690,387 | 9/1987 | Rockenshaub et al. | 266/156 |

FOREIGN PATENT DOCUMENTS

| | | |
|---|---|---|
| 2112369 | 11/1972 | Fed. Rep. of Germany . |
| 3308304 | 9/1984 | Fed. Rep. of Germany . |
| 2362789 | 3/1978 | France . |
| 1566970 | 5/1980 | United Kingdom . |

OTHER PUBLICATIONS

Pöttken et al., "Stahl and Eisen", vol. 95, No. 3, pp. 91-99 (1975).
Riquarts et al., "Linde Berichte aus Technik und Wissenschaft", No. 57 (1985), partial translation.

Primary Examiner—Melvyn J. Andrews
Attorney, Agent, or Firm—Ostrolenk, Faber, Gerb & Soffen

[57] ABSTRACT

There is described a mill for the production of steel from liquid and solid charging substances. It includes a coking plant, a blast furnace plant, a converter steelworks, and a plant for the direct reduction of iron ore. The converter steelworks is charged with molten pig iron from the blast furnace and with scrap as well as with sponge iron from the direct reduction plant. The reduction gas is composed of converter offgas, top gas and blast furnace gas. In order to avoid coal deposits in the direct reduction plant and to improve the composition of the reduction gas, the coke oven gas component is subjected to fractionation by alternating pressure adsorption so as to increase its portion of hydrogen and to lower its portion of hydrocarbons.

7 Claims, 1 Drawing Sheet

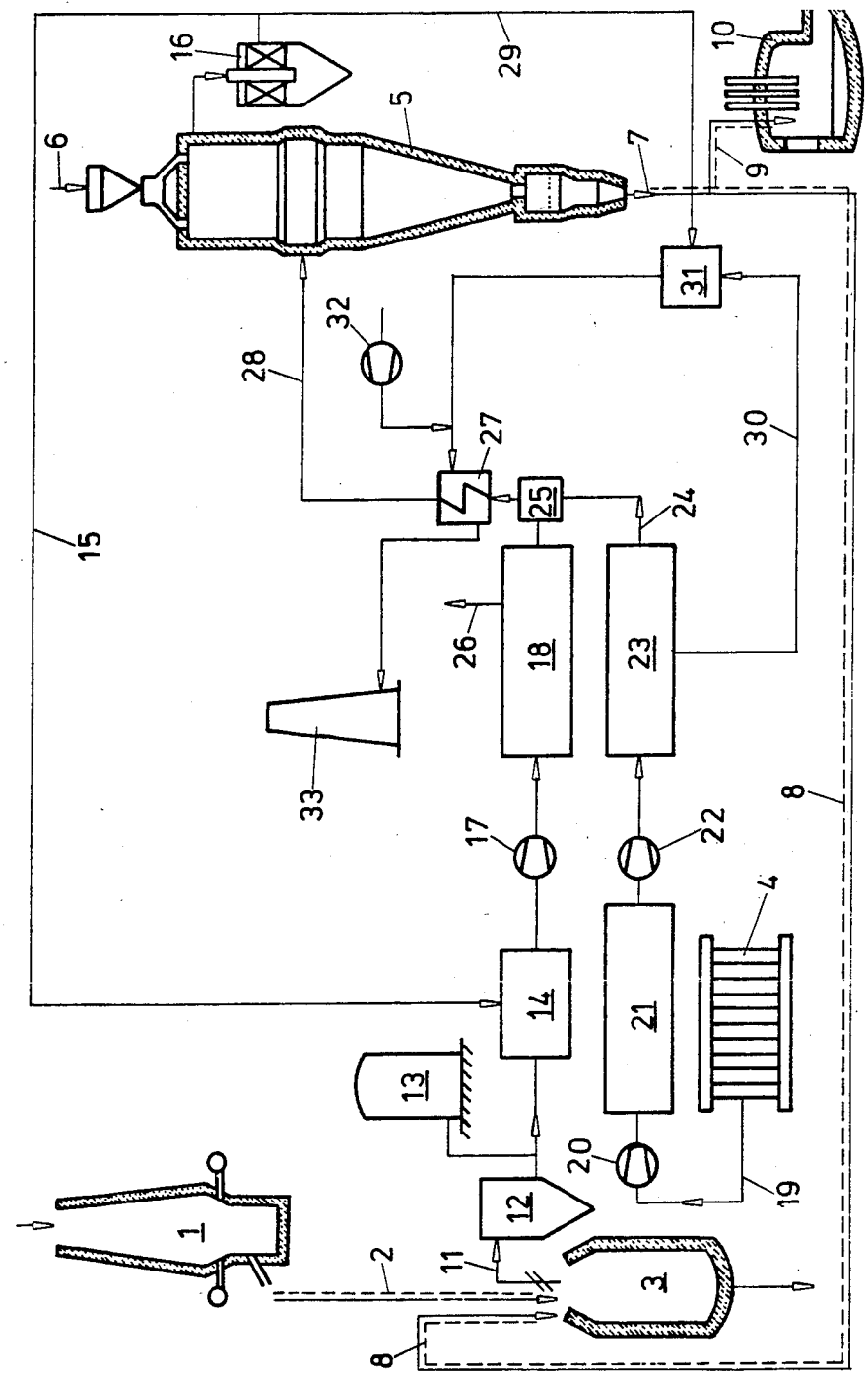

MILL ARRANGEMENT WITH PRIMARY GAS MIXING MEANS

The invention relates to a mill for the production of steel from liquid and solid charging substances, comprising a coking plant, a blast furnace plant, a converter steelworks, a plant for the direct reduction of iron ore, the converter steelworks being charged with molten pig iron from the blast furnace plant and with scrap, on the one hand, and with sponge iron from the direct reduction plant, on the other hand, and a mixing arrangement for discontinuously incurring converter offgas, for top gas from the direct reduction plant and for coke oven gas for the formation of reduction gas, as well as to a method of operating the mill.

In conventional mills, which produce steel in steel converters by top blowing oxygen onto and/or blowing oxygen into molten pig iron, the pig iron is produced in blast furnaces by using ores and high-quality coke. Since the pig iron production in large blast furnaces is the most economic, developments have tended to go into the direction of blast furnaces with the highest outputs, which must be operated over periods of time as long as possible without interruption. When using such blast furnaces, large amounts of pig iron must be taken over by the steelworks, i.e., a plurality of high-capacity steel converters is required to process the pig iron. Storage of the molten pig iron produced is possible to a limited extent only. Casting of molten pig iron to pigs during interruptions in the steelworks operation or during operational failures is uneconomic.

In conventional mills, primarily steel scrap is used as coolant in steel converters. When using scrap, the steelworks operator will be faced with problems in case the scrap is bought, not knowing its exact composition. Frequently, undesired accompanying elements are introduced into the metal melt by such scrap, which cannot be removed any more in the refining process.

In order to avoid difficulties of this type, it has been proposed to integrate a direct reduction plant in the mill, the sponge iron incurring being used partially as a coolant in the converter(s) and partially as the solid charge in other meltdown aggregates. The reduction gas for the direct reduction plant is composed of converter offgases, coke oven gas and top gas from the direct reduction plant. It has, however, proved disadvantageous that the admixture of coke oven gas is limited, because the coke oven gas has considerable contents of hydrocarbons, in particular methane, which cause the formation of free carbon in the reduction shaft of the direct reduction plant. The separation of carbon results in a poor gas passage through the shaft furnace and, thus, impairs the briquetting properties of the reduction product. In addition, the methane decomposition is endothermic and has a cooling effect.

The invention aims at avoiding these disadvantages and difficulties and has as its object, with a mill of the initially defined kind and a method for its operation, to improve the properties of the reduction gas and to prevent the formation of carbon deposits in the direct reduction plant. Moreover, according to a further aspect of the invention, impurities, such as sulfur, which either are introduced into the steel together with the sponge iron or are a load to the environment with sulfur-containing offgases, are to be largely avoided.

These objects are achieved according to the invention by arranging a fractionation means for recovering hydrogen-rich gas and, if desired, a desulfurization means in the coke oven gas feed.

The method of operation of a mill according to the invention, with the converter(s) of the converter steelworks being charged with molten pig iron from the blast furnace plant and with sponge iron from the direct reduction plant and the reduction gas for the direct reduction plant being composed of converter offgas, top gas and coke oven gas, is characterized in that the coke oven gas portion is desulfurized at least partially and is fractionated so as to elevate its hydrogen content.

Preferably, an alternating pressure adsorption process is used.

Alternating pressure adsorption processes are known per se. They are based on that highly volatile components of low polarities, such as hydrogen, cannot be adsorbed as in contrast to gas molecules, such as $CO_2$ and hydrocarbons. The adsorption of undesired impurities preferably takes place at a high pressure, which results in the adsorbant being highly loaded with the impurities to be adsorbed. Desorption and regeneration are effected at a low pressure. The process operates at ambient temperature, i.e., no heat is required for regeneration.

The invention will be explained in more detail by the accompanying flow sheet.

Pig iron 2 produced in a blast furnace 1 is charged into a steelworks converter 3 as the liquid charge. This converter may be designed as an LD top blowing converter or as a combined top blowing—bottom blowing converter with or without supply of heat carriers.

In the mill, there is, furthermore, integrated a coking plant 4 serving to supply coke oven gas, and a direct reduction plant 5, suitably a direct reduction shaft furnace. The direct reduction shaft furnace is charged with iron ore 6, hot-briquetted sponge iron 7 being produced therefrom. The latter is supplied to the converter as a solid charge via a conveying means 8. A portion may also be supplied via a conveying means 9 to an electric arc furnace 10 for further processing.

Converter offgas is discontinuously withdrawn via a conduit 11, is washed in a scrubber 12, is cooled and is collected in a gas reservoir 13. From the reservoir 13, the gas is continuously supplied to a first mixing station 14, where it is mixed with the top gas 15 coming from the direct reduction plant. A scrubbing means 16 may be provided in conduit 15.

The mixed gas formed of top gas and converter offgas is supplied to a $CO_2$ stripping means 18 via a compressor 17.

The coke oven gas coming from the coking plant is conducted to a desulfurization plant 21 via a conduit 19 and a compressor 20. The desulfurization plant may be designed as a scrubbing column with wet chemical desulfurization. The coke oven gas is supplied to a fractionation means 23 via a further compressor 22, which fractionation means preferably is designed as an adsorber battery according to the pressure swing adsorption process.

The fractionated coke oven gas is withdrawn via a conduit 24 and is mixed in a second mixing station 25 with the gas stream coming from the stripper 18 and comprised of converter offgas and top gas 15. $CO_2$-containing sulfur-free offgas is removed from the stripper 18 via conduit 26. The reduction gas produced with the fractionated coke oven gas in the mixing station 25 is preheated in a preheater 27 and is then fed into the reduction shaft furnace via conduit 28. The first mixing station 14 and second mixing station 25, with the intermediate elements shown, constitute the primary gas mixing means of this invention.

The preheater may be operated by indirect heat exchange with top gas from conduit 29 branching off scrubber 16 and, if desired, with $CH_4$-rich gas from conduit 30 coming from the fractionation means. Excess $CH_4$-rich gas is supplied to other consumers. An additional mixing station is denoted by 31, an air compressor by 32 and a flue gas stack by 33.

Although not specifically designated by reference numerals, it will be seen from the drawing and description thereof that gas fractionating means 23 has hydrogen-rich gas withdrawal means and hydrocarbon-rich gas withdrawal means; blast furnace 1 has pig iron withdrawal means; steelworks converter 3 has a charging inlet and converter offgas withdrawal means; direct reduction furnace 5 has sponge iron withdrawal means and top gas withdrawal means.

A typical exemplary embodiment of the use of the method according to the invention is the following:

With an integrated mill of the type according to the invention, the material flow may be approximately as follows:

A blast furnace produces 431 tons of pig iron/hour having the following composition: 4.73% C, 0.60% Si, 0.69% Mn, 0.11% P, 0.04% S, 93.83% Fe.

Three steelworks converters, each having a capacity of 180 tons, are charged with a burden of 431 tons pig iron/hour, 78.8 tons scrap/hour and 65 tons hot-briquetted sponge iron/hour having the following composition: 86.50% Fe (metallic), 1.2% C, 0.015% S, 0.04% P, 3.80% gangue, 93% Fe (total), 93% metallization degree; the ratio of liquid to solid charges is 3:1. There are produced 505 tons crude steel/hour having the following composition: 0.03% C, 0.25% Mn, 0.025% P, 0.020% S, 0.0% Si.

Excess hot-briquetted sponge iron also is converted into steel in an electric furnace.

The offgas leaving the converter has the following composition: 64.5% CO, 18.4% $CO_2$ 0.7% $H_2$, 16.4% $N_2$. It is mixed in an amount of 40,404 $Nm^3$/hour with top gas in an amount of 91,500 $Nm^3$/h having the following composition: 25% CO, 20% $CO_2$, 22.5% $H_2$, 3% $H_2O$, 30% $N_2$. Coke oven gas having a composition of 6.21% CO; 1.87% $CO_2$, 60.26% $H_2$, 2.77% higher hydrocarbons, 0.1% $O_2$, 25.82% $CH_4$, 2.97% $N_2$ is desulfurized in an amount of 55,613 $Nm^3$/hour in the desulfurization plant, the sulfur content being lowered from 0.1% to 30 p.p.m., and subsequently is fractionated in the fractionation plant.

The hydrogen content amounts to 60.26% prior to fractionation and 99.9% upon fractionation.

The reduction gas composed in the mixing station 25 has the following composition 36% CO, 1.9% $CO_2$, 35% $H_2$, 2.5% $H_2O$, 24.6% $N_2$. It is fed into the reduction shaft furnace in an amount of 136,500 $Nm^3$/hour.

What we claim is:

1. A mill arrangement for producing steel from liquid and solid charging substances comprising:
   (a) coke oven gas supply means;
   (b) fractionating means including hydrogen-rich gas withdrawal means and hydrocarbon-rich gas withdrawal means,
   (c) a blast furnace including molten pig iron withdrawal means;
   (d) a steelworks converter including charging inlet and converter offgas withdrawal means;
   (e) a direct iron ore reduction plant including sponge iron withdrawal means and top gas withdrawal means;
   (f) means for transporting molten pig iron from said blast furnace withdrawal means to said steelworks converter;
   (g) means for transporting sponge iron from said reduction plant sponge iron withdrawal means to said steelworks converter;
   (h) primary gas mixing means including means for withdrawing mixed gases;
   (i) means for transporting coke oven gas from said coke oven gas supply means to said fractionating means;
   (j) means for transporting hydrogen-rich gas from said hydrogen-rich gas withdrawal means of said fractionating means to said primary gas mixing means;
   (k) means for transporting converter offgas from said converter offgas withdrawal means to said primary gas mixing means;
   (l) means for transporting top gas from said top gas withdrawal means of said direct iron ore reduction plant to said primary gas mixing means; and
   (m) means for transporting mixed gases from said primary gas mixing means to said direct iron ore reduction plant.

2. A mill arrangement as set forth in claim 1 further comprising desulfurization means arranged in said coke oven gas supply means upstream of said fractionating means.

3. A mill arrangement as set forth in claim 1 wherein said gas fractioning means comprises a pressure swing adsorption fractionator.

4. A mill arrangement as set forth in claim 1 wherein said means for transporting mixed gases from said primary gas mixing means to said direct iron ore reduction plant includes means for preheating said mixed gases.

5. A mill arrangement as set forth in claim 4 including also means for conducting direct iron ore reduction plant top gas into indirect contact in said preheating means with said mixed gas from said primary gas mixing means.

6. A mill arrangement as set forth in claim 4 further comprising additional mixing means including withdrawal means for mixed gases; means for transporting hydrocarbon rich gas from said hydrocarbon-rich gas withdrawal means of said gas fractionating means to said additional mixing means; means for transporting direct iron ore reduction plant top gas to said additional mixing means; and means for conducting mixed gases from said mixed gases withdrawal means of said additional mixing means to said means for preheating the mixed gases from said primary gas mixing means.

7. A mill arrangement as set forth in claim 1 wherein said primary gas mixing means comprises, in series, first mixing means, $CO_2$ stripping means and second mixing means and gas transportation means leading from said first mixing means to said stripping means and from said stripping means to said second mixing means; said means (k) for transporting converter off gas and said means (l) for transporting top gas lead to said first mixing means; and said means (j) for transporting hydrogen-rich gas leads to said second mixing means.

* * * * *